(12) United States Patent
Polasa et al.

(10) Patent No.: US 12,073,376 B2
(45) Date of Patent: Aug. 27, 2024

(54) LIGHT-WEIGHT AND SECURE PAYMENT PROCESSING USING A LOW-POWER WIDE-AREA NETWORKING PROTOCOL

(71) Applicant: Bank of America Corporation, Charlotte, NC (US)

(72) Inventors: Puneetha Polasa, Telangana (IN); Bhagya Lakshmi Sudha Lavanya Mallidi, Hyderabad (IN); Sandeep Kumar Chauhan, Hyderabad (IN); Udaya Kumar Raju Ratnakaram, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/828,606

(22) Filed: May 31, 2022

(65) Prior Publication Data

US 2023/0385803 A1   Nov. 30, 2023

(51) Int. Cl.
*G06Q 20/32* (2012.01)
(52) U.S. Cl.
CPC ....... *G06Q 20/325* (2013.01); *G06Q 20/3224* (2013.01)
(58) Field of Classification Search
CPC .......... G06Q 20/325; G06Q 20/3224
USPC ........................................... 705/41
See application file for complete search history.

(56) References Cited

U.S. PATENT DOCUMENTS

| | | | |
|---|---|---|---|
| 2002/0019985 A1 | 2/2002 | Fuccello et al. |
| 2006/0149671 A1 | 7/2006 | Nix et al. |
| 2008/0208681 A1 | 8/2008 | Hammad et al. |
| 2012/0225639 A1 | 9/2012 | Gazdzinski et al. |
| 2013/0206835 A1 | 8/2013 | Gazdzinski |
| 2015/0170136 A1 | 6/2015 | Patel et al. |
| 2015/0206045 A1 | 7/2015 | Gazdzinski |
| 2015/0294304 A1 | 10/2015 | Donnellan et al. |
| 2015/0356561 A1 | 12/2015 | Chang et al. |
| 2016/0005024 A1 | 1/2016 | Harrell |
| 2016/0358385 A1 | 12/2016 | Ziebell et al. |
| 2017/0132621 A1 | 5/2017 | Miller et al. |

(Continued)

OTHER PUBLICATIONS

Qadir, Qahhar Muhammad, et al. "Low Power Wide Area Networks: A Survey Enabling Technologies, Applications and Interoperability Needs." IEEE Access. vol. 6. 2018. p. 77454-77473. (Year: 2018).*

*Primary Examiner* — Sara C Hamilton
(74) *Attorney, Agent, or Firm* — Banner & Witcoff, Ltd.

(57) ABSTRACT

Aspects of the disclosure relate to light-weight and secure payment processing using low-power wide-area network technology. A mobile device may detect communication conditions associated with a payment transaction based on one or more parameters. The mobile device may identify applicability of LPWAN communication based on the communication conditions. Based on identifying the applicability of low-power wide-area network communication, the mobile device may identify a payment terminal within a threshold proximity of the mobile device. The mobile device may connect to the payment terminal via a low-power wide-area network protocol. The mobile device may transmit, via the low-power wide-area network protocol, a request to initiate the payment transaction at the payment terminal. The mobile device may cause the payment transaction to be executed using the low-power wide-area network protocol.

17 Claims, 11 Drawing Sheets

(56) References Cited

U.S. PATENT DOCUMENTS

| | | |
|---|---|---|
| 2017/0178090 A1 | 6/2017 | Sarin |
| 2017/0221067 A1 | 8/2017 | Barquero Garro et al. |
| 2018/0197163 A1 | 7/2018 | Kelly et al. |
| 2019/0045346 A1 | 2/2019 | Macieira |
| 2019/0108015 A1* | 4/2019 | Sridhara ............... G06F 9/4451 |
| 2019/0228654 A1* | 7/2019 | Olsen ............... G08G 1/096716 |
| 2019/0318382 A1 | 10/2019 | Yang et al. |
| 2019/0349426 A1 | 11/2019 | Smith et al. |
| 2020/0074437 A1* | 3/2020 | Bonsi ................... G06Q 20/326 |
| 2020/0273024 A1 | 8/2020 | Gorilovsky et al. |
| 2021/0044919 A1 | 2/2021 | Ivanov et al. |
| 2021/0152633 A1 | 5/2021 | Gorilovsky et al. |
| 2021/0195394 A1 | 6/2021 | Van Nieuwenhuyze et al. |
| 2022/0067698 A1 | 3/2022 | Griffin et al. |
| 2022/0138722 A1 | 5/2022 | McClard et al. |
| 2022/0147996 A1 | 5/2022 | Paranjpe et al. |

* cited by examiner

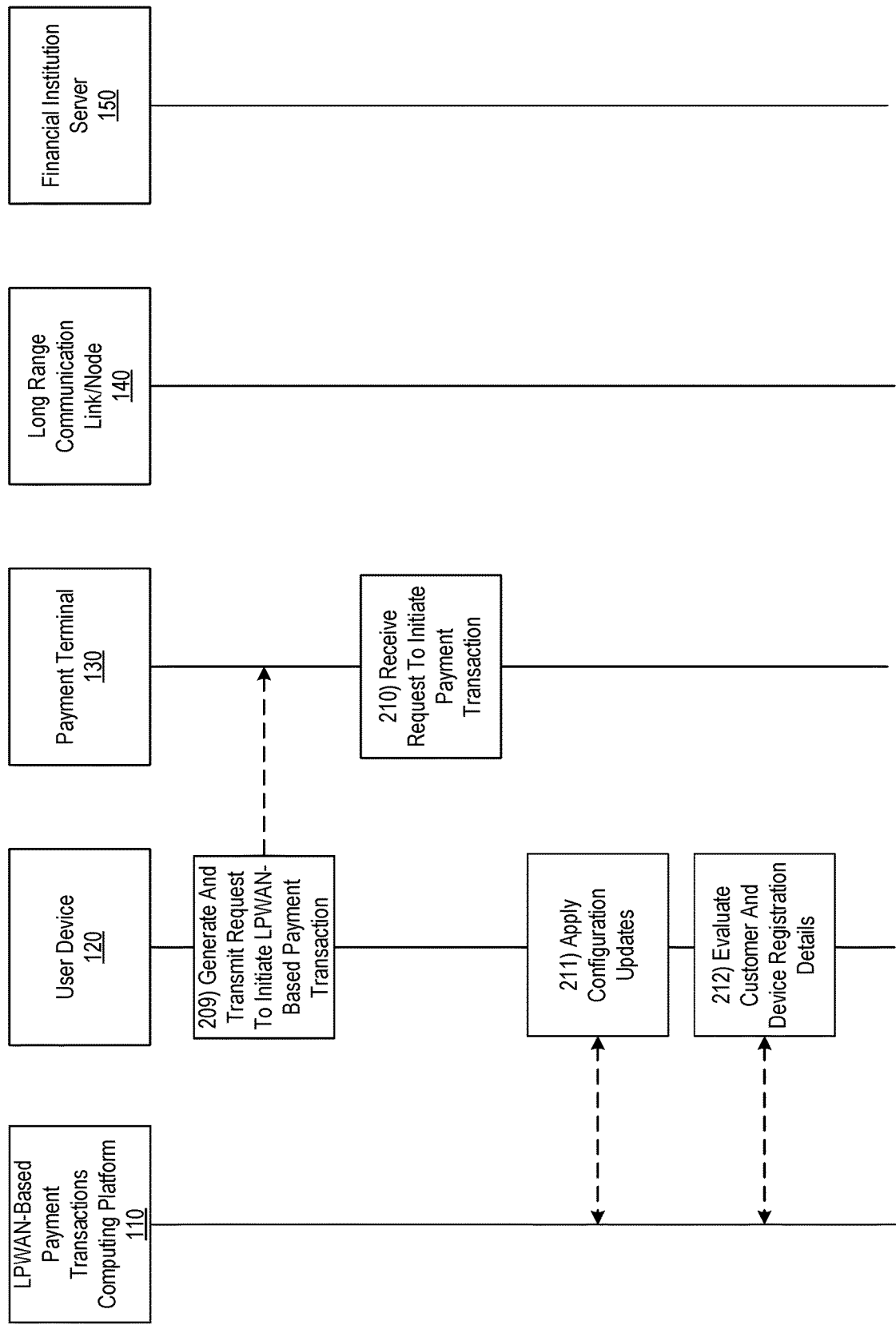

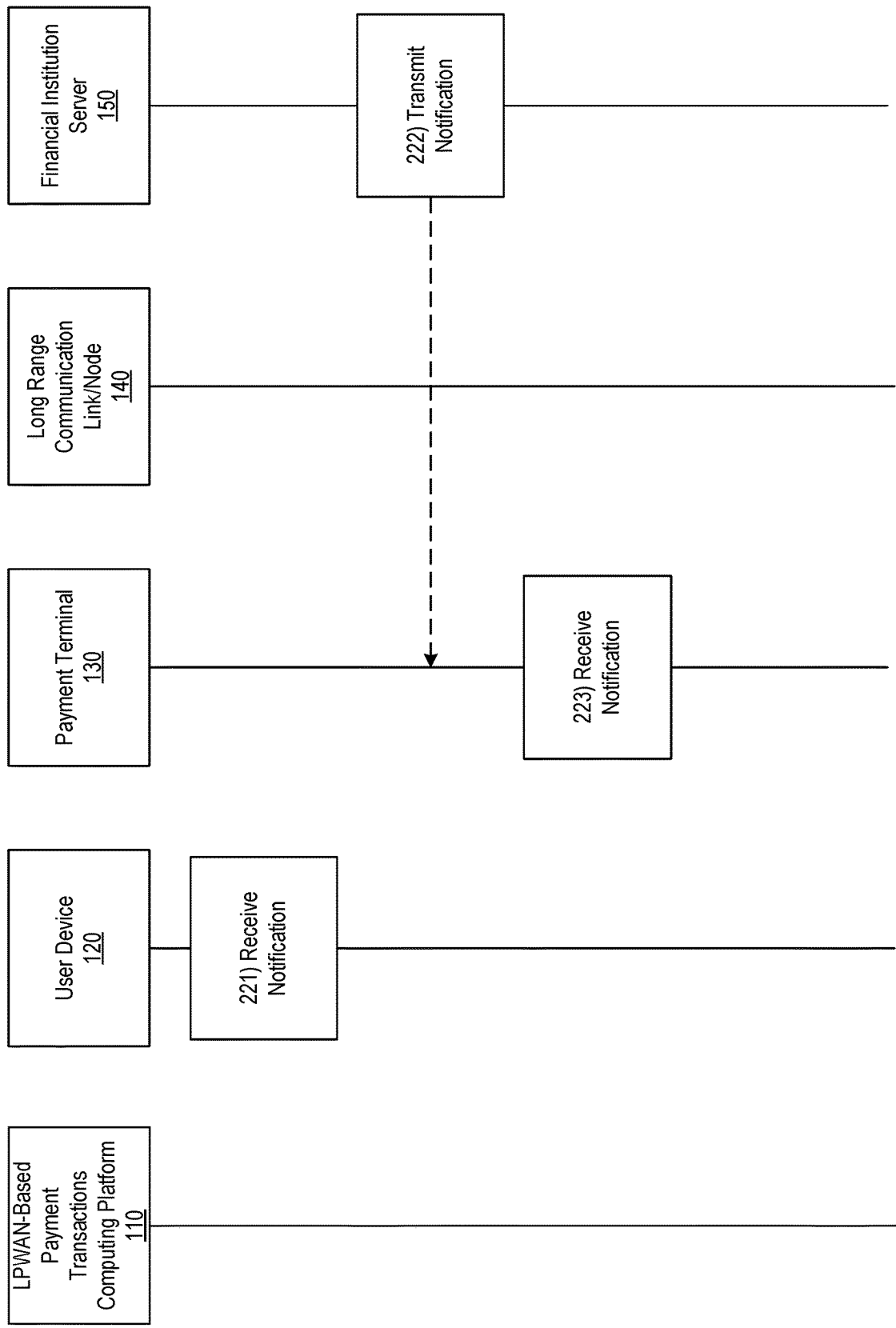

LIGHT-WEIGHT AND SECURE PAYMENT PROCESSING USING A LOW-POWER WIDE-AREA NETWORKING PROTOCOL

BACKGROUND

Aspects of the disclosure relate to electrical computers, systems, and devices for seamless, secure payment processing based on low-power wide-area network (LPWAN) technology.

Oftentimes, applications running on user equipment devices, such as mobile or smart devices, require Wi-Fi/Internet and/or cellular networks to function. However, in remote or rural areas, it may be difficult to perform payment transactions due to network latency and/or lack of network connectivity. In many instances, customers might be left with making payments by cash, leading to processing delays, and/or other inefficiencies. Accordingly, it would be advantageous to leverage low-power wide-area network technology to identify and process payment transactions, particularly those involving low-power devices, in offline situations when access to Internet and/or cellular networks is unavailable or disabled.

SUMMARY

Aspects of the disclosure provide effective, efficient, scalable, and convenient technical solutions that address and overcome the technical problems associated with performing internet-based or cellular transactions in remote areas with limited coverage by using light-weight and secure payment processing using low-power wide-area network technology. In accordance with one or more embodiments, a mobile device having at least one processor, a communication interface, and memory may detect communication conditions associated with a payment transaction based on one or more parameters. The mobile device may identify applicability of low-power wide-area network communication based on the communication conditions. Based on identifying the applicability of low-power wide-area network communication, the mobile device may identify a payment terminal within a threshold proximity of the mobile device. The mobile device may connect to the payment terminal via a low-power wide-area network protocol. The mobile device may transmit, via the low-power wide-area network protocol, a request to initiate the payment transaction at the payment terminal. The mobile device may cause the payment transaction to be executed using the low-power wide-area network protocol.

In some examples, identifying the payment terminal within a threshold proximity of the mobile device may include: detecting a geographic location of the payment terminal; and calculating a proximity of the payment terminal to the mobile device based on the geographic location of the payment terminal relative to the mobile device.

In some embodiments, the mobile device may receive configuration information set by a user associated with the mobile device indicating a usage condition associated with use of low-power wide-area network communication for payment processing. Based on receiving the configuration information, the mobile device may transmit a request to register the mobile device on a low-power wide-area network to be useable for low-power wide-area network communication.

In some arrangements, the configuration information associated with the mobile device may specify one or more of: a device, a location, a transaction threshold amount, a transaction type, a transaction source, or a transaction date.

In some examples, transmitting the request to initiate the payment transaction at the payment terminal via the low-power wide-area network protocol may include transmitting the request based on an unavailability of cellular or Internet connectivity.

In some embodiments, causing the payment transaction to be executed using the low-power wide-area network protocol may include: causing the payment terminal to communicate with a financial institution server via a correspondent low-power wide-area network communication node connected to the Internet; and causing processing, via the financial institution server, the payment transaction.

In some example arrangements, the mobile device may, prior to executing the payment transaction, receive a notification requesting authorization from a user of the mobile device to process the payment transaction via the low-power wide-area network protocol; and send input from the user of the mobile device in response to the notification.

In some examples, the mobile device may apply updates to a mobile application installed on the mobile device or to configuration information associated with the mobile device.

In some arrangements, transmitting the request to initiate the payment transaction at the payment terminal via the low-power wide-area network protocol may include transmitting the request based on a battery state of charge of the mobile device.

In some embodiments, the one or more parameters may include one or more of: a device geolocation, a device range, a device power consumption, a connectivity bandwidth, a weather condition, or a transaction load.

In some examples, the mobile device may include one or more of: a voice assistant device, a mobile device, or a wearable device.

In some embodiments, transmitting the request to initiate the payment transaction at the payment terminal may include initiating the payment transaction at a gas station or a toll gate.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for light-weight and secure payment processing using a low-power wide-area network protocol in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to light-weight and secure payment processing using a low-power wide-area network (LPWAN) protocol. For example, the LPWAN protocol may enable long range communications (e.g., typically up to a 10 mile or 15 kilometer radius) between connected devices with minimal energy requirements. In particular, one or more aspects of the disclosure may enable and employ a low-power wide-area network protocol for payment processing on-the-go, without needing access to the Internet and/or cellular networks. Additional aspects of the disclosure may automatically and intelligently identify the applicability and/or need for low-power wide-area network communication and automatically switch a communication channel to LPWAN for light-weight and secure payment processing. Further aspects of the disclosure may automatically and intelligently identify transactions which can be performed partially on LPWAN and partially on another communication channel, for example, in situations where Internet/Wi-Fi or cellular connectivity might rapidly or constantly change based on temporal and/or spatial factors.

Figure 1A:
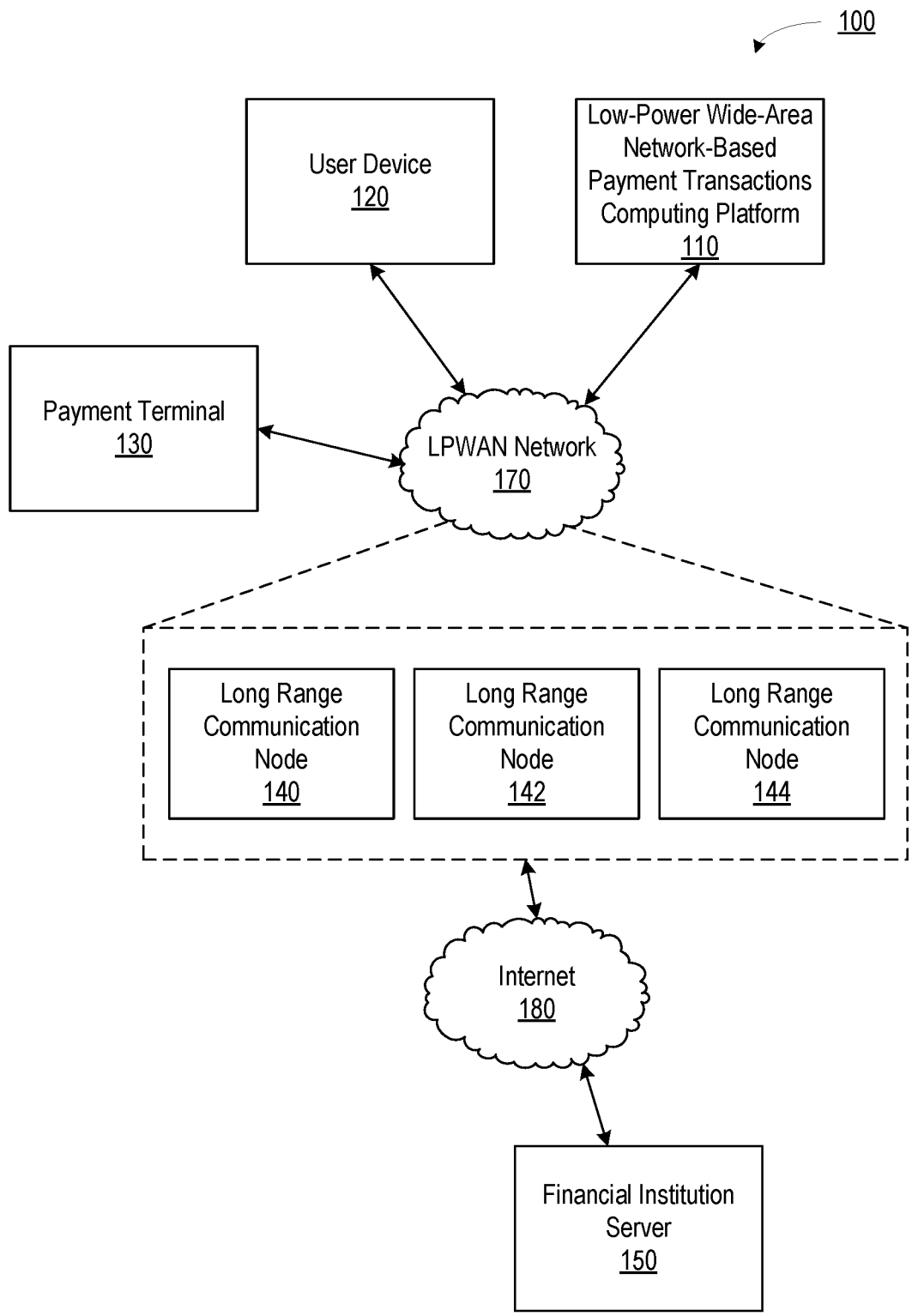
FIGS. 1A-1C depict an illustrative computing environment for light-weight and secure payment processing using a low-power wide-area network protocol in accordance with one or more example embodiments.
Figure 1B:
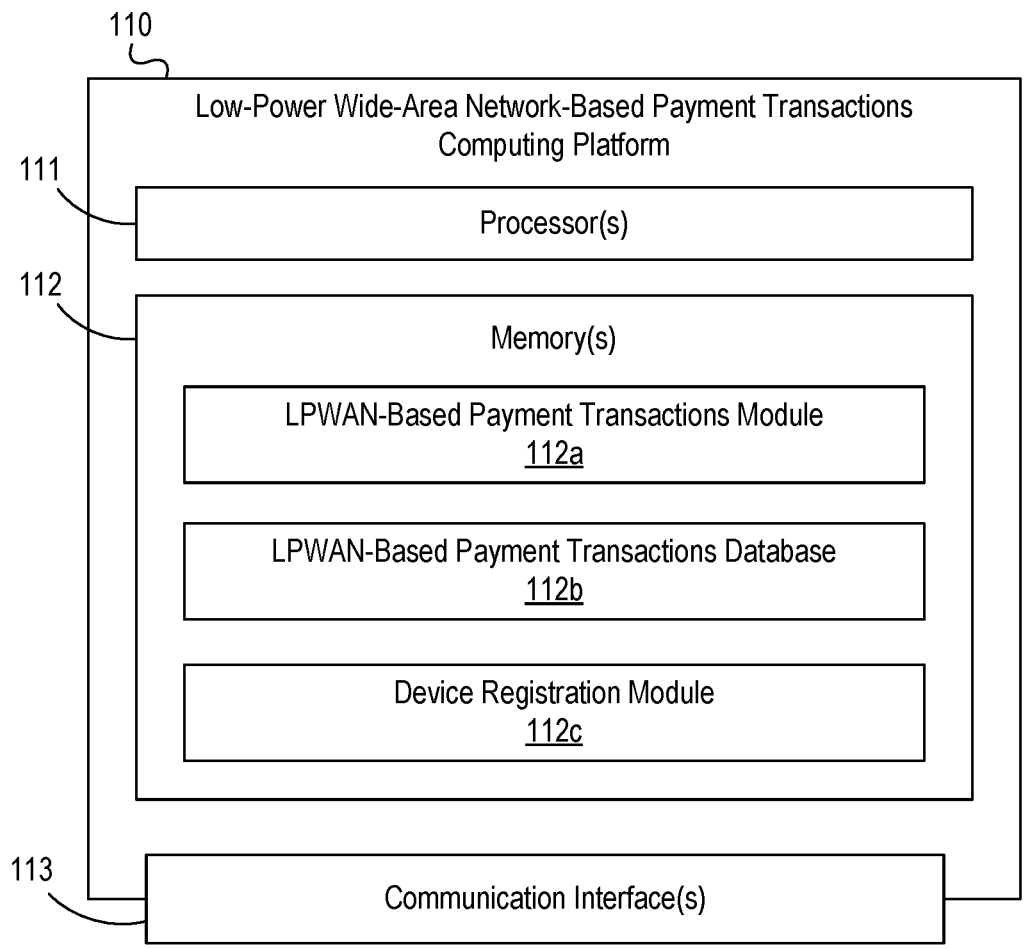
Figure 1C:
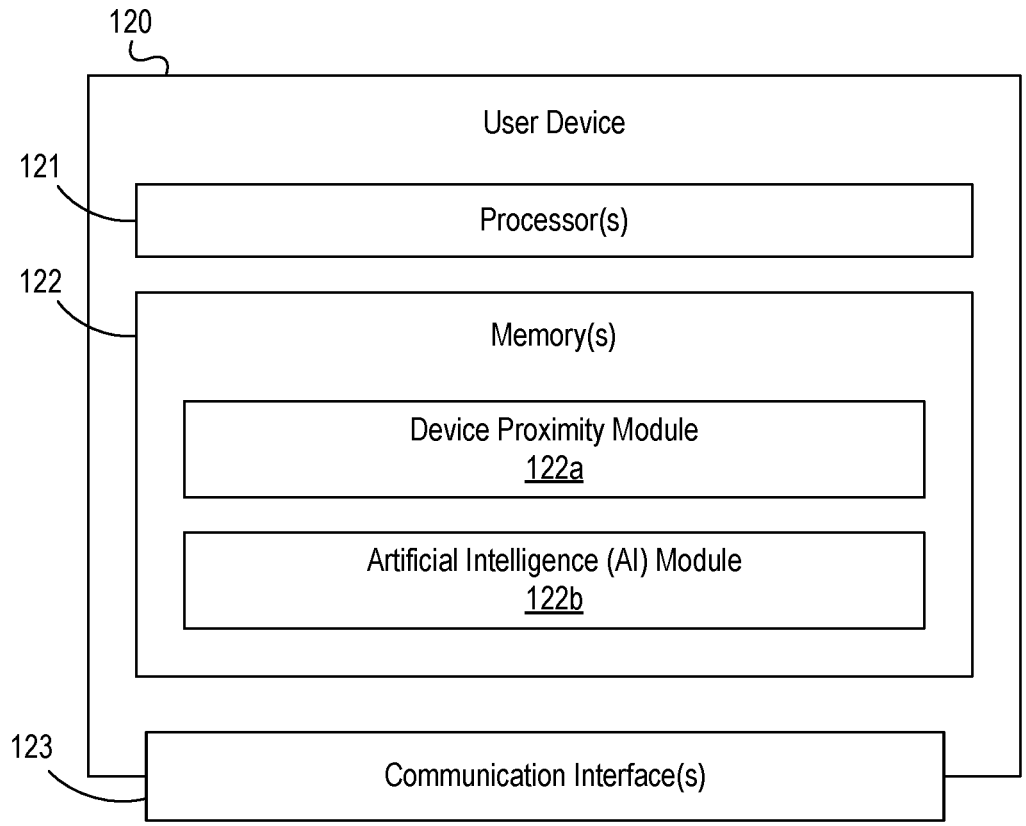

FIGS. 1A-1C depict an illustrative computing environment for light-weight and secure payment processing using a low-power wide-area network protocol in accordance with one or more example embodiments. Referring to FIG. 1A, computing environment 100 may include one or more computing devices and/or other computing systems. For example, computing environment 100 may include LPWAN-based payment transactions computing platform 110, user device 120, payment terminal 130, long range communication node 140, and financial institution server 150. Although one user device 120, one payment terminal 130 and one financial institution server 150 are shown, any number of systems or devices may be used without departing from the disclosure. Although several long range communication nodes 140, 142, 144 are shown, any number of nodes may be used without departing from the disclosure.

As illustrated in greater detail below, LPWAN-based payment transactions computing platform 110 may be a computer system that includes one or more computing devices (e.g., servers, server blades, or the like) and/or other computer components (e.g., processors, memories, communication interfaces) configured to perform one or more of the functions described herein. For example, LPWAN-based payment transactions computing platform 110 may include one or more computers that may be configured to provide intelligent, dynamic, and seamless payments based on LPWAN technology. For instance, users may register devices for LPWAN communication by configuring dynamic settings of an application, such as a mobile banking application hosted by the enterprise organization. LPWAN-based payment transactions computing platform 110 may process payment transactions through LPWAN technology when there are challenges connecting to Internet and/or mobile network communications.

User device 120 may include one or more computing devices and/or other computer components (e.g., processors, memories, communication interfaces). For instance, user device 120 may be and/or include a server, desktop computer, laptop computer, a voice assistant device, a mobile device (e.g., a smart phone, a tablet), a wearable device (e.g., a smart watch, fitness tracker), or the like. The user device 120 may execute an application, such as a mobile banking application hosted by the enterprise organization, that may receive notifications, transmit data in response, and the like.

Payment terminal 130 may be a terminal proximate a point-of-sale and operated by a vendor in order to interact with one or more users (e.g., consumers). For example, in some embodiments, payment terminal 130 may include, but is not limited to, a keypad, a monitor, a card-reading device and the like. In some embodiments, payment terminal 130 includes one or more of a processing device, a communication device, an input device and other components or one or more of those components are separate from the payment terminal 130 and are configured for communicating with the payment terminal 130.

Long range communication node 140 may be one node of a plurality of nodes in a low-power wide-area network 170 that utilizes smart, long-range, wireless transmission technology. Long range communication node 140 may connect to the Internet 180 via the standard Internet Protocol (IP). Long range communication node 140 may be configured to process LPWAN network messages and store the information provided by the LPWAN network messages.

Financial institution server 150 may be associated with LPWAN-based payment transactions computing platform 110. For example, financial institution server 150 may be in network communication with LPWAN-based payment transactions computing platform 110 via the Internet 180, long range communication node 140, and LPWAN network 170, although other public and/or private intranets may also be implemented in accordance with embodiments of the disclosure. Financial institution server 150 may be operated by a financial institution at which the user (e.g., of user device 120) has a financial account.

Computing environment 100 also may include one or more networks, which may interconnect one or more of LPWAN-based payment transactions computing platform 110, user device 120, payment terminal 130, long range communication node 140, financial institution server 150, or the like. For example, computing environment 100 may include a low-power wide-area network 170 and Internet 180 (which may interconnect, e.g., LPWAN-based payment transactions computing platform 110, user device 120, payment terminal 130, long range communication node 140, financial institution server 150, and/or one or more other systems which may be associated with an enterprise organization, such as a financial institution, with one or more other systems, public networks, sub-networks, and/or the like).

In one or more arrangements, LPWAN-based payment transactions computing platform 110, user device 120, payment terminal 130, and financial institution server 150 may be any type of computing device capable of receiving a user interface, receiving input via the user interface, and communicating the received input to one or more other computing devices. For example, LPWAN-based payment transactions computing platform 110, user device 120, payment terminal 130, financial institution server 150, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, LPWAN-based payment transactions computing platform 110 may include one or more processor(s) 111, memory(s) 112, and communication interface(s) 113. A data bus may interconnect processor 111, memory 112, and communication interface 113. Communication interface 113 may be a network interface configured to support communication between LPWAN-based payment transactions computing platform 110 and one or more networks (e.g., LPWAN network 170, Internet 180, or the like). Memory 112 may include one or more program modules having instructions that when executed by processor 111 cause LPWAN-based payment transactions computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of LPWAN-based payment transactions computing platform 110 and/or by different computing devices that may form and/or otherwise make up LPWAN-based payment transactions computing platform 110. For example, memory 112 may have, store, and/or include an LPWAN-based payment transactions module 112a, an LPWAN-based payment transactions database 112b, and a device registration module 112c. LPWAN-based payment transactions module 112a may have instructions that direct and/or cause LPWAN-based payment transactions computing platform 110 to provide intelligent, dynamic, and seamless payments based on LPWAN technology and/or perform other functions, as discussed in greater detail below. LPWAN-based payment transactions database 112b may store information used by LPWAN-based payment transactions module 112a and/or LPWAN-based payment transactions computing platform 110 in providing light-weight and secure payment processing using a low-power wide-area networking protocol and/or in performing other functions. Device registration module 112c may have instructions that direct and/or cause LPWAN-based payment transactions computing platform 110 to register devices with the low-power wide-area network to enable LPWAN-based payment transactions, store one or more identifiers corresponding to each device registered in the module, maintain and update a database of information about the registered devices, and/or the like.

Figure 2A:
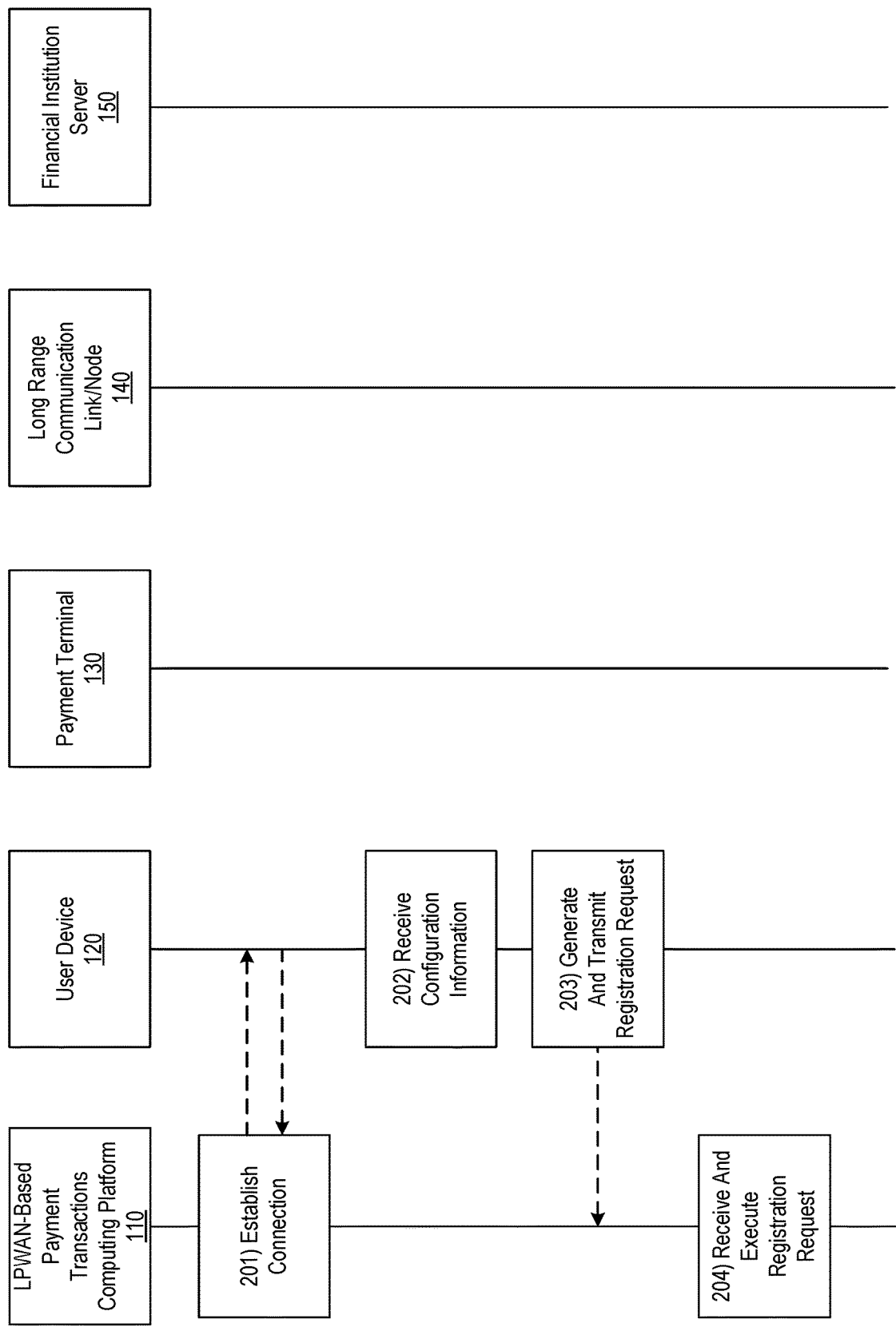

Referring to FIG. 1C, user device 120 may include one or more processors 121, memory 122, and communication interface 123. A data bus may interconnect processor 121, memory 122, and communication interface 123. Communication interface 123 may be a network interface configured to support communication between user device 120 and one or more networks (e.g., LPWAN network 170, Internet 180, or the like). Memory 122 may include one or more program modules having instructions that when executed by processor 121 cause user device 120 to perform one or more functions described herein and/or one or more databases that may store and/or otherwise maintain information which may be used by such program modules and/or processor 121. In some instances, the one or more program modules and/or databases may be stored by and/or maintained in different memory units of user device 120 and/or by different computing devices that may form and/or otherwise make up user device 120. For example, memory 122 may have, host, store, and/or include device proximity module 122a and artificial intelligence (AI) module 122b. Device proximity module 122a may have instructions that direct and/or cause user device 120 to receive current location information associated with a computing device (e.g., geographic location (geolocation) information) including a user computing device, analyze (e.g., calculate) proximity data collected using one or more sensors of a computing device (e.g., to detect a payment terminal within a range of the computing device), and/or the like. Artificial intelligence (AI) module 122b or other analytics module may perform device and/or network data analysis. For example, AI module 122b may automatically and intelligently sense the applicability and/or need for LPWAN communication. For instance, based on certain parameters (e.g., a device geolocation, a device range, a device power consumption, a connectivity bandwidth, a weather condition, a transaction load, and/or the like), AI module 122b may intelligently identify the need for LPWAN communication and automatically switch a communication channel to LPWAN for light-weight and secure payment processing. FIGS. 2A-2F depict an illustrative event sequence for light-weight and secure payment processing using a low-power wide-area network protocol in accordance with one or more example embodiments described herein. Referring to FIG. 2A, at step 201, user device 120 may establish a connection with LPWAN-based payment transactions computing platform 110 For example, user device 120 may establish a first low-power wireless connection with LPWAN-based payment transactions computing platform 110 to link user device 120 with LPWAN-based payment transactions computing platform 110. In some instances, user device 120 may identify whether or not a connection is already established with LPWAN-based payment transactions computing platform 110. If a connection is already established with LPWAN-based payment transactions computing platform 110, user device 120 might not re-establish the connection. If a connection is not yet established with the LPWAN-based payment transactions computing platform 110, user device 120 may establish the first low-power wireless connection as described above.

At step 202, a user device (e.g., user device 120) may receive configuration information set by a user associated with the user device (e.g., user device 120) indicating a usage condition associated with use of low-power wide-area network communication for payment processing. In some examples, the user device (e.g., user device 120) may include a voice assistant device, a mobile device, a wearable device, and/or the like. In some examples, the configuration information may indicate whether and when to use low-power wide-area network communication for payment processing. In some examples, the configuration information associated with the user device (e.g., user device 120) may specify a device, a location, a transaction threshold amount, a transaction type, a transaction source, a transaction date, and/or the like. For instance, a user might restrict the use of low-power wide-area network communication for payment processing to only certain devices, to only certain geographic regions or locations, to only certain categories of retailers or products/services, to only transactions below a threshold amount, and/or the like. Such restrictions may be used for detecting and preventing fraudulent use, or to otherwise distinguish abnormal or malicious activity. For instance, an attempted fraudulent use of a user's device for LPWAN-based payment processing in a non-user approved location would fail or be terminated.

Figure 3:
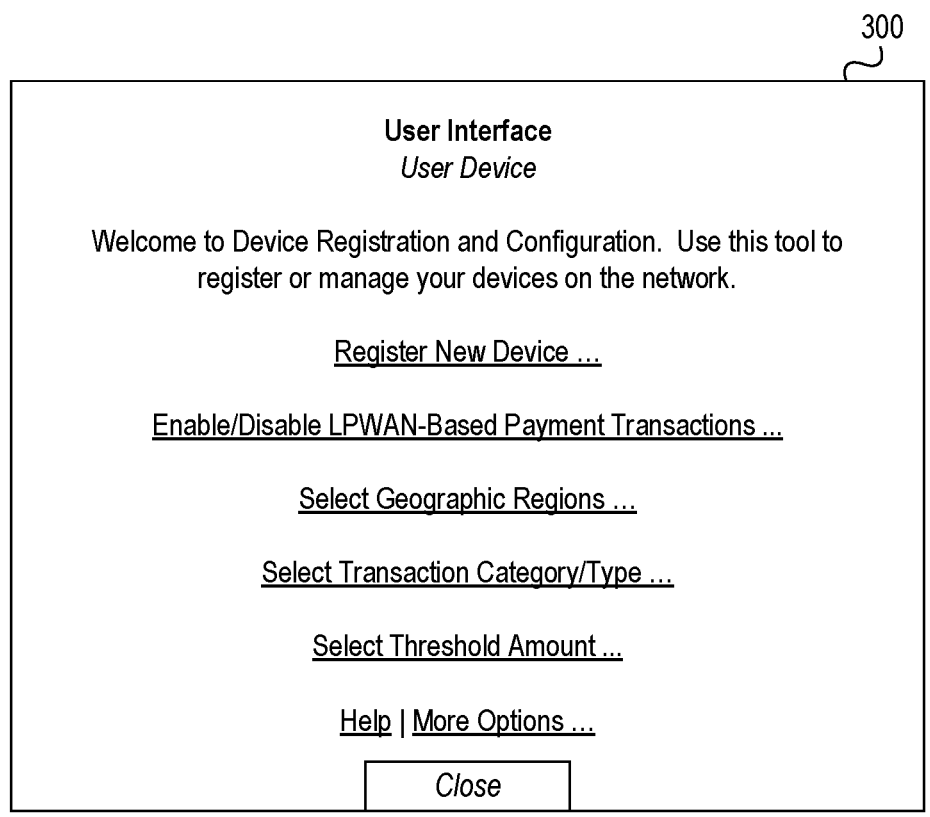
FIG. 3 depicts an illustrative graphical user interface associated with light-weight and secure payment processing using a low-power wide-area network protocol in accordance with one or more example embodiments.

In some examples, as part of the device registration and configuration process, LPWAN-based payment transactions computing platform 110 may cause the user device (e.g., user device 120) to display and/or otherwise present one or more graphical user interfaces similar to graphical user interface 300, which is illustrated in FIG. 3. As seen in FIG. 3, graphical user interface 300 may include text and/or other information associated with device registration and configuration (e.g., "Welcome to Device Registration and Configuration. Use this tool to register or manage your devices on the network. [Register New Device . . . ] [Enable/Disable LPWAN-Based Payment Transactions . . . ] [Select Geographic Regions . . . ] [Select Transaction Category/Type . . . ] [Select Threshold Amount . . . ]"). For instance, users may enable or disable certain features by toggling a switch or button, via a touch input or other user input. It will be appreciated that other and/or different notifications may also be provided. Returning to FIG. 2A, at step 203, the user device (e.g., user device 120) may generate and transmit a registration request (e.g., to LPWAN-based payment transactions computing platform 110) to register the user device (e.g., user device 120) on a low-power wide-area network to be useable for low-power wide-area network communication. For instance, the registration request may be transmitted during the communication session initiated upon establishing the first low-power wireless connection.

At step 204, LPWAN-based payment transactions computing platform 110 may receive and execute the registration request. For example, LPWAN-based payment transactions computing platform 110 may register (e.g., via device registration module 112c) the user device (e.g., user device 120) to be useable on the low-power wide-area communication network based on the configuration information set by the user of the user device (e.g., user device 120). In some examples, LPWAN-based payment transactions computing platform 110 may store user data and device registration information in a reference database (e.g., for use in future validations of user and device registrations).

Figure 2B:
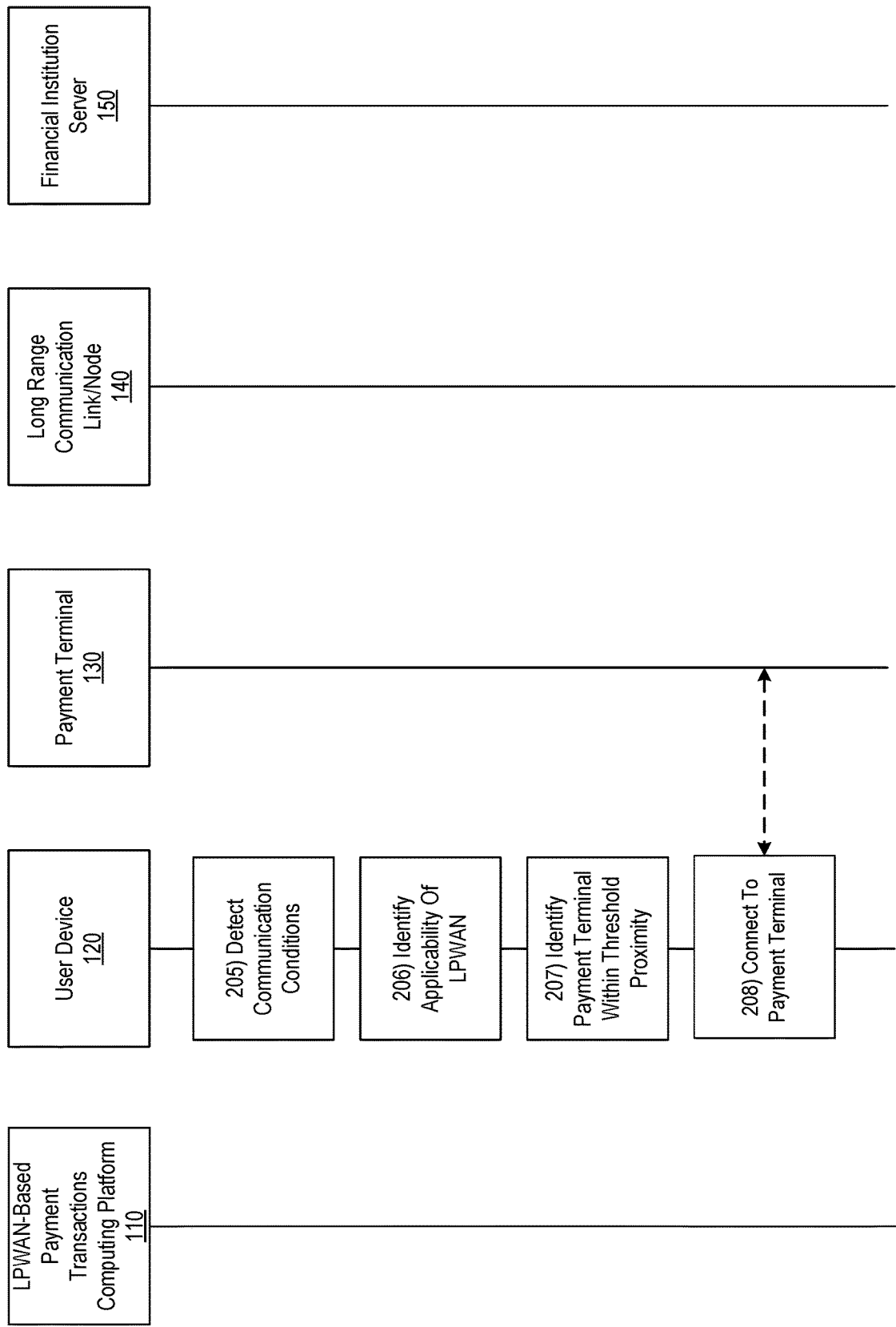

Referring to FIG. 2B, at step 205, the user device (e.g., user device 120) may detect communication conditions or needs associated with a payment transaction based on one or more parameters. In some examples, the one or more parameters may include a device geolocation, a device range, a device power consumption, a connectivity bandwidth, sensor data (e.g., indicating a weather condition at a location), a transaction load, and/or the like.

At step 206, the user device (e.g., user device 120) may identify the applicability and/or need for low-power wide-area network communication based on the communication conditions. In some examples, based on the communication conditions, the user device (e.g., user device 120) may automatically designate or assign a LPWAN communication channel to the payment transaction for light-weight and secure payment processing. Additionally or alternatively, the user device (user device 120) may automatically and intelligently identify transactions which can be performed partially on LPWAN and partially on another communication channel, for example, in situations where Internet/Wi-Fi or cellular connectivity might rapidly or constantly change based on temporal and/or spatial factors.

At step 207, based on identifying the applicability of low-power wide-area network communication the user device (e.g., user device 120) may identify a payment terminal within a threshold proximity of the user device (e.g., user device 120). For example, user device (e.g., user device 120) may detect location information (e.g., a geographic location) of the payment terminal (e.g., payment terminal 130) and calculate a proximity of the payment terminal (e.g., payment terminal 130) to the user device (e.g., user device 120) based on the geographic location of the payment terminal (e.g., payment terminal 130) relative to the user device (e.g., user device 120). In some examples, the user device (e.g., user device 120) may periodically receive, from the payment terminal (e.g., payment terminal 130), location information associated with the payment terminal (e.g., payment terminal 130). Receiving the location information associated with the payment terminal may include receiving information from the payment terminal for an indication of one or more payment terminals that are physically proximate to the user device (e.g., within a defined proximity radius from the user device). For instance, the user device (e.g., user device 120) may detect the presence of payment terminal 130 being within a predetermined or predefined range of user device 120 (e.g., the calculated proximity being within a threshold proximity). In some examples, the payment terminal (e.g., a point-of-sale terminal) may include a gas station, a toll gate, a subway turnstile or gate, a parking meter, a checkout station, a drive-through ordering station, a pay phone, an automated teller machine (ATM), and/or the like.

At step 208, the user device (e.g., user device 120) may connect to (e.g., establish a connection with) the identified payment terminal (e.g., payment terminal 130) via a low-power wide-area network protocol. For example, user device 120 may establish a second low-power wireless connection with payment terminal 130 to link user device 120 with payment terminal 130. In some instances, user device 120 may identify whether or not a connection is already established with payment terminal 130. If a connection is already established with payment terminal 130, user device 120 might not re-establish the connection. If a connection is not yet established with the payment terminal 130, user device 120 may establish the second low-power wireless connection as described above.

Upon establishing the second low-power wireless connection, the user device (e.g., user device 120) may begin wireless communication with the payment terminal 130 via the low-power wide-area network protocol. For instance, the user device 120 may broadcast or transmit LPWAN network messages to the payment terminal 130 for LPWAN-based payment processing. Payment terminal 130 may be connected to nodes (e.g., long range communication node 140) that are connected to the Internet, and that are specifically designed to process the LPWAN network messages.

In some embodiments, in processing the LPWAN network messages, marshalling and unmarshalling routines may occur between client and server data structures (e.g., between a central processing server and a financial institution server). A marshalling process may convert a memory representation of an object (e.g., LPWAN messages) to a data format suitable for storage or transmission. For example, data may be gathered and transformed into a standard format before it is transmitted over a network. An unmarshalling process may disassemble incoming network data and convert it into application data using a format that a local system understands.

Referring to FIG. 2C, at step 209, the user device (user device 120) may generate and transmit a request to initiate a payment transaction at the payment terminal (e.g., to payment terminal 130) via a low-power wide-area network protocol. For instance, the generated transaction request may be transmitted from user device 120 to payment terminal 130 during the communication session initiated upon establishing the second low-power wireless connection. In some examples, the request to initiate the payment transaction via the low-power wide-area network protocol is based on an unavailability or limited availability of cellular or Internet connectivity (e.g., in remote areas with limited coverage). In some examples, the request to initiate the payment transaction via the low-power wide-area network protocol is based on a battery state of charge of the user device (e.g., a low state of charge of a device battery insufficient for processing a payment transaction). At step 210, payment terminal 130 may receive the transaction request and initiate the requested payment transaction.

At step 211, the user device (e.g., user device 120) may apply dynamic configuration updates (e.g., software configuration updates) to device settings of the user device (e.g., user device 120) and/or to applications (e.g., mobile banking applications) installed on the user device (e.g., user device 120).

At step 212, LPWAN-based payment transactions computing platform 110 may evaluate various details for enabling low-power wide-area network communication. For instance, LPWAN-based payment transactions computing platform 110 may evaluate customer identification information, device registration information, and/or the like. In some examples, the details relating to customer and device topology may be stored in a cache. When a new device enters into the device topology, LPWAN-based payment transactions computing platform 110 may update some or all of the cache (e.g., for a particular user).

Figure 2D:
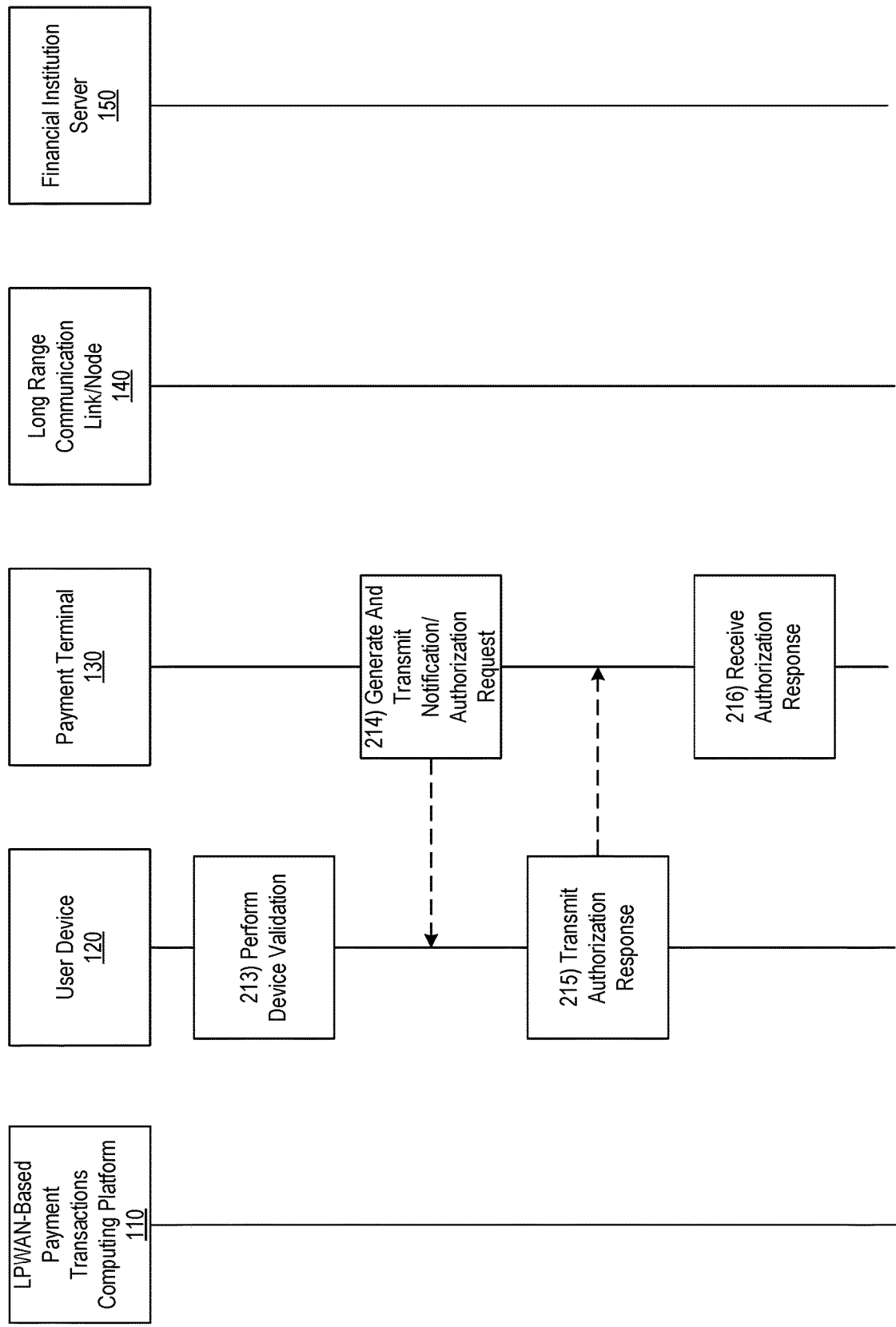
Figure 2E:
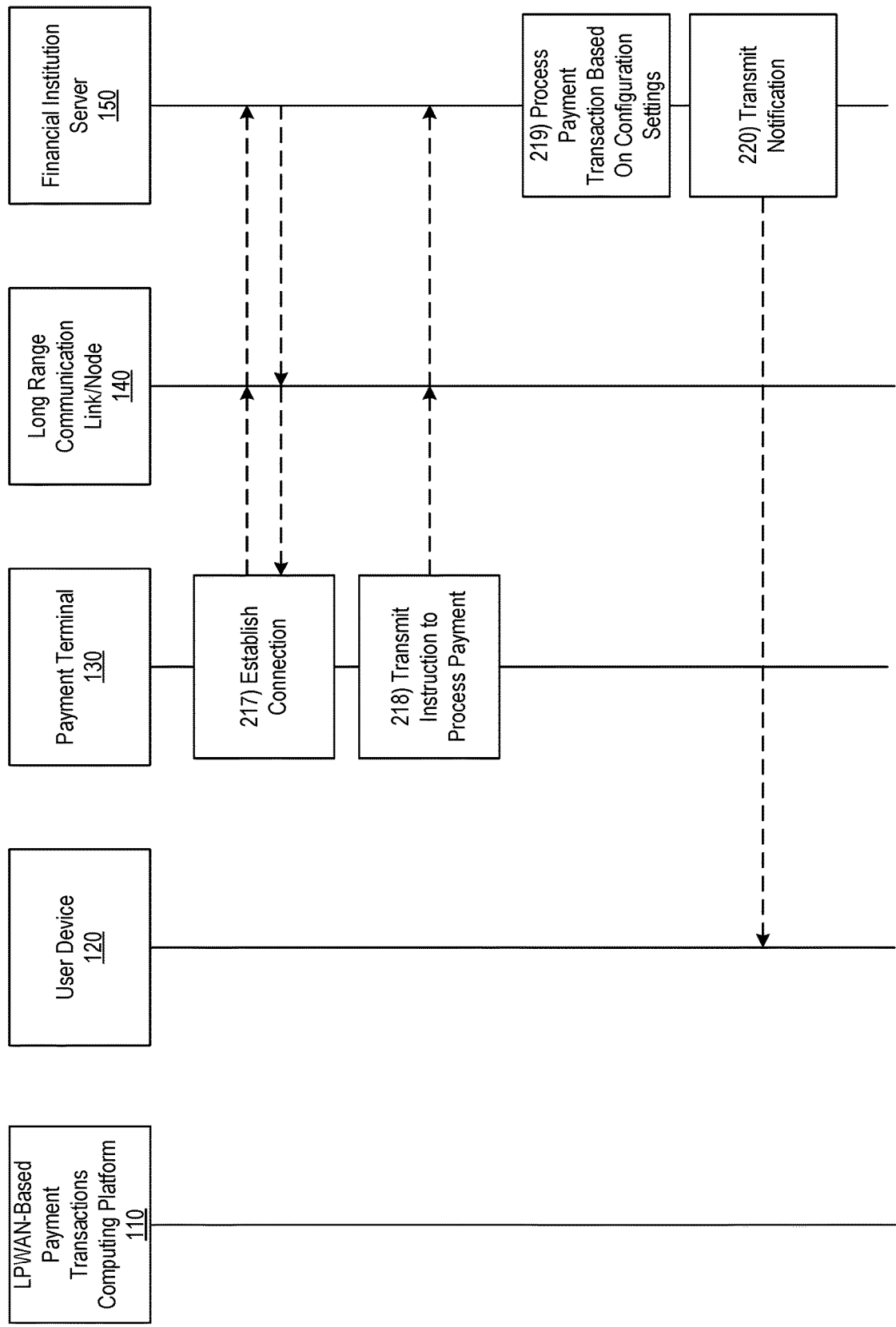

Referring to FIG. 2D, at step 213, device validation may be performed on user device (e.g., user device 120). For instance, user device (e.g., user device 120) may validate or confirm user information (e.g., authenticate a user), device information (e.g., device registration information), location information (e.g., device proximity information), and/or related factors for establishing secure communication before executing the LPWAN-based payment transaction.

In some embodiments, at step 214, prior to the payment transaction being executed, the payment terminal (e.g., payment terminal 130) may generate a notification requesting authorization from the user of the user device (e.g. user of user device 120) to process the payment transaction and transmit the generated authorization request to the user device (e.g., user device 120). For instance, the generated authorization request may be transmitted during the communication session initiated upon establishing the second low-power wireless connection.

At step 215, the user device (e.g. user of user device 120) may send, via the communication interface (e.g., communication interface 123) and while the second low-power wireless connection is established, user feedback to payment terminal 130. For instance, user input may be received via the user device 120 to provide the requested authorization or approval (e.g., authorizing the payment transaction). At step 216, payment terminal 130 may, while the second low-power wireless connection is established, receive the authorization response (e.g., user input) from the user device (e.g., user device 120) to process the payment transaction.

At step 217, payment terminal 130 may establish a connection with financial institution server 150. For example, payment terminal 130 may establish a third low-power wireless connection with financial institution server 150 to link payment terminal 130 with financial institution server 150 (e.g., via long range communication node 140). In some instances, payment terminal 130 may identify whether or not a connection is already established with financial institution server 150. If a connection is already established with payment terminal 130, payment terminal 130 might not re-establish the connection. If a connection is not yet established with the payment terminal 130, payment terminal 130 may establish the third low-power wireless connection as described above. At step 218, the user device (e.g., user device 120) may cause the payment transaction to be executed using a low-power wide-area network protocol. For example, the user device may cause the payment terminal (e.g., payment terminal 130) to transmit an instruction to instruct a financial institution server (e.g., financial institution server 150) to process the payment transaction. In some examples, the instruction may be transmitted during the communication session initiated upon establishing the third low-power wireless connection. For instance, the user device (user device 120) may cause the payment terminal (e.g., payment terminal 130) to communicate with a financial institution server (e.g., financial institution server 150) via a correspondent low-power wide-area network communication node (e.g., long range communication node 140), which is connected to the Internet. In turn, the payment terminal (e.g., payment terminal 130) may transmit the payment instruction to long range communication node 140 to complete processing of the requested payment transaction at the financial institution server (e.g., financial institution server 150).

At step 219, financial institution server 150 may process the payment transaction (e.g., based on the configuration information associated with the user device 120). For instance, the payment transaction may be processed, funds transferred, account ledgers updated, and the like, and one or more notifications may be generated. For instance, one or more notifications indicating that the payment has been processed, and the like, may be generated. At step 220, one or more notifications may be transmitted to the user device 120. For example, referring to FIG. 2F at step 221, the notification may be received by user computing device 120 and displayed on a display of user computing device 120 or otherwise may alert the user to the notification. For instance, haptic feedback may be initiated in response to the user computing device 120 receiving the notification to alert the user to the notification.

In some examples, the payment may be automatically processed without user interaction or enterprise interaction. For instance, if a requested transaction meets certain criteria (e.g., dollar amount below a threshold or the like), the transaction may be processed (e.g., without user input, or the like), and steps 214 through 216 may be omitted.

Additionally or alternatively, at step 222, one or more notifications may be transmitted by the financial institution server 150 to payment terminal 130. For instance, a notification confirming payment processing may be transmitted. At step 223, the notification may be received by the payment terminal 130.

Figure 4:
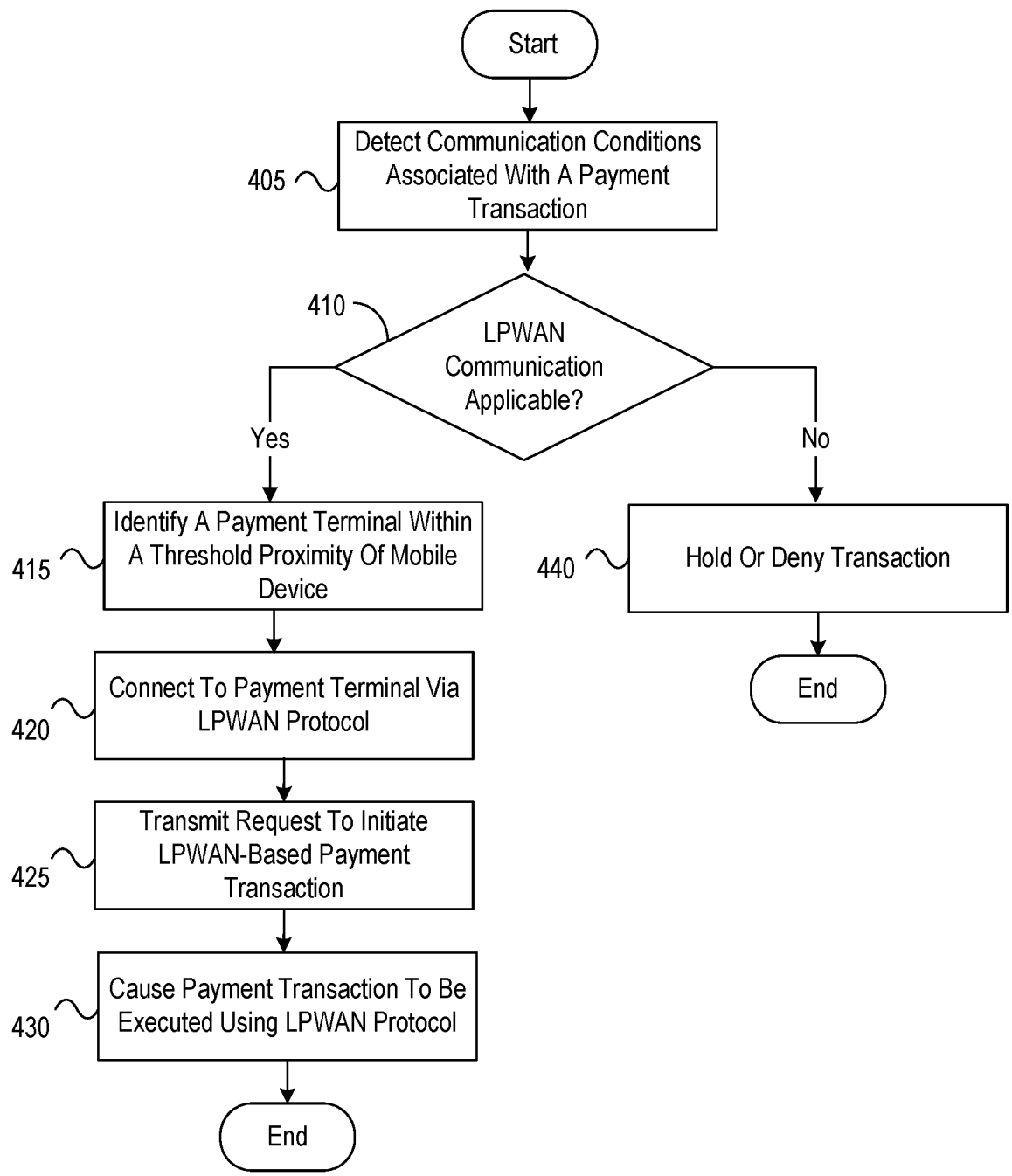
FIG. 4 depicts an illustrative method for light-weight and secure payment processing using a low-power wide-area network protocol in accordance with one or more example embodiments.

FIG. 4 depicts an illustrative method for light-weight and secure payment processing using a low-power wide-area network protocol in accordance with one or more example embodiments. Referring to FIG. 4, at step 405, a mobile device having at least one processor, a communication interface, and memory may detect communication conditions associated with a payment transaction based on one or more parameters. At step 410, the mobile device may identify applicability of low-power wide-area network communication based on the communication conditions. If it is determined in decision block 410 that LPWAN communication is applicable, the mobile device may proceed to step 415. At step 415, based on identifying the applicability of low-power wide-area network communication, the mobile device may identify a payment terminal within a threshold proximity of the mobile device. At step 420, the mobile device may connect to the payment terminal via a low-power wide-area network protocol. At step 425, the mobile device may transmit, via the low-power wide-area network protocol, a request to initiate the payment transaction at the payment terminal. At step 430, the mobile device may cause the payment transaction to be executed using the low-power wide-area network protocol. If it is determined in decision block 410 that LPWAN communication is not applicable, the mobile device may proceed to step 440. At step 440, the mobile device may hold or defer the transaction until a suitable connection is available, deny the transaction, or place other restrictions on the transaction.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A mobile device comprising:
   at least one processor;
   a communication interface communicatively coupled to the at least one processor; and
   a memory storing instructions that, when executed by the at least one processor, cause the mobile device to:
   identify unavailability of at least one of: cellular connectivity or internet connectivity by identifying network communication conditions in a geographic area and associated with a payment transaction based on one or more parameters;
   identify, based on the identified network communication conditions in the geographic area, a type of the mobile device and a characteristic of the payment transaction, applicability of low-power wide-area network communication for processing the payment transaction;
   based on identifying the applicability of low-power wide-area network communication, identify a payment terminal within a threshold proximity of the mobile device based on detected location information of the payment terminal and the geographic area;
   connect to the payment terminal via a low-power wide-area network protocol;
   transmit, via the communication interface and via the low-power wide-area network protocol, a request to initiate the payment transaction at the payment terminal; and
   cause the payment transaction to be executed using the low-power wide-area network protocol, wherein causing the payment transaction to be executed includes causing the payment terminal to transmit a payment instruction to a long range communication node connected to the internet to complete processing of the payment transaction by a financial institution server.

2. The mobile device of claim 1, wherein identifying the payment terminal within a threshold proximity of the mobile device comprises:
   calculating a proximity of the payment terminal to the mobile device based on a geographic location of the payment terminal relative to the geographic area.

3. The mobile device of claim 1, wherein the instructions, when executed by the at least one processor, further cause the mobile device to:
   receive configuration information set by a user associated with the mobile device indicating a usage condition associated with use of low-power wide-area network communication for payment processing, wherein the usage condition includes types of device for use with low-power wide-area network communication and characteristics of payment transactions to be processed using low-power wide-area network communications; and based on receiving the configuration information, transmit a request to register the mobile device on a low-power wide-area network to be useable for low-power wide-area network communication.

4. The mobile device of claim 3, wherein the configuration information associated with the mobile device specifies one or more of: a transaction threshold amount, a transaction type, a transaction source, or a transaction date.

5. The mobile device of claim 1, wherein the instructions, when executed by the at least one processor, further cause the mobile device to:

prior to executing the payment transaction, receive a notification requesting authorization from a user of the mobile device to process the payment transaction via the low-power wide-area network protocol; and send input from the user of the mobile device in response to the notification.

6. The mobile device of claim 1, wherein the instructions, when executed by the at least one processor, further cause the mobile device to:

apply updates to one or more of: a mobile application installed on the mobile device or configuration information associated with the mobile device.

7. The mobile device of claim 1, wherein transmitting the request to initiate the payment transaction at the payment terminal via the low-power wide-area network protocol comprises transmitting the request further based on a battery state of charge of the mobile device.

8. The mobile device of claim 1, wherein the one or more parameters comprise one or more of: a device range, a device power consumption, a connectivity bandwidth, a weather condition, or a transaction load.

9. The mobile device of claim 1, wherein the mobile device is one or more of: a voice assistant device or a wearable device.

10. The mobile device of claim 1, wherein transmitting the request to initiate the payment transaction at the payment terminal comprises initiating the payment transaction at a gas station or a toll gate.

11. A method comprising:

identifying, by a mobile device, unavailability of at least one of: cellular connectivity or internet connectivity by identifying network communication conditions in a geographic area and associated with a payment transaction based on one or more parameters;

identifying, by the mobile device and based on the identified network communication conditions in the geographic area, a type of the mobile device and a characteristic of the payment transaction, applicability of low-power wide-area network communication for processing the payment transaction;

based on identifying the applicability of low-power wide-area network communication, identifying, by the mobile device, a payment terminal within a threshold proximity of the mobile device based on detected location information of the payment terminal and the geographic area;

connecting, by the mobile device, to the payment terminal via a low-power wide-area network protocol;

transmitting, by the mobile device, via the low-power wide-area network protocol, a request to initiate the payment transaction at the payment terminal; and causing, by the mobile device, the payment transaction to be executed using the low-power wide-area network protocol, wherein causing the payment transaction to be executed includes causing the payment terminal to transmit a payment instruction to a long range communication node connected to the internet to complete processing of the payment transaction by a financial institution server.

12. The method of claim 11, wherein identifying the payment terminal within a threshold proximity of the mobile device comprises:

calculating, by the mobile device, a proximity of the payment terminal to the mobile device based on a geographic location of the payment terminal relative to the geographic area.

13. The method of claim 11, further comprising:

receiving, by the mobile device, configuration information set by a user associated with the mobile device indicating a usage condition associated with use of low-power wide-area network communication for payment processing, wherein the usage condition includes types of device for use with low-power wide-area network communication and characteristics of payment transactions to be processed using low-power wide-area network communications; and based on receiving the configuration information, transmitting, by the mobile device, a request to register the mobile device on a low-power wide-area network to be useable for low-power wide-area network communication.

14. The method of claim 13, wherein the configuration information associated with the mobile device specifies one or more of: a transaction threshold amount, a transaction type, a transaction source, or a transaction date.

15. The method of claim 11, wherein transmitting the request to initiate the payment transaction at the payment terminal via the low-power wide-area network protocol comprises transmitting the request further based on at least one of: a battery state of charge of the mobile device, or an unavailability of cellular or Internet connectivity.

16. The method of claim 11, further comprising:

prior to executing the payment transaction, receiving, by the mobile device, a notification requesting authorization from a user of the mobile device to process the payment transaction via the low-power wide-area network protocol; and sending, by the mobile device, input from the user of the mobile device in response to the notification.

17. One or more non-transitory computer-readable media storing instructions that, when executed by at least one processor of a mobile computing device, cause the mobile computing device to:

identify unavailability of at least one of: cellular connectivity or internet connectivity by identifying network communication conditions in a geographic area and associated with a payment transaction based on one or more parameters;

identify, based on the identified network communication conditions in the geographic area, applicability of low-power wide-area network communication for processing the payment transaction, a type of the mobile computing device and a characteristic of the payment transaction;

based on identifying the applicability of low-power wide-area network communication, identify a payment terminal within a threshold proximity of the computing device based on detected location information of the payment terminal and the geographic area;

connect to the payment terminal via a low-power wide-area network protocol;

transmit, via the low-power wide-area network protocol, a request to initiate the payment transaction at the payment terminal; and cause the payment transaction to be executed using the low-power wide-area network protocol, wherein causing the payment transaction to be executed includes causing the payment terminal to transmit a payment instruction to a long range communication node connected to the internet to complete processing of the payment transaction by a financial institution server.

\* \* \* \* \*